United States Patent [19]
Anwyl et al.

[11] Patent Number: 5,338,976
[45] Date of Patent: Aug. 16, 1994

[54] INTERACTIVE LANGUAGE CONVERSION SYSTEM

[75] Inventors: Phyllis Anwyl, Yokohama; Toru Matsuda, Machida, both of Japan

[73] Assignee: Ricoh Company, Ltd., Tokyo, Japan

[21] Appl. No.: 899,269

[22] Filed: Jun. 16, 1992

[30] Foreign Application Priority Data

Jun. 20, 1991 [JP] Japan .................................. 3-175944
Dec. 11, 1991 [JP] Japan .................................. 3-351636

[51] Int. Cl.$^5$ ............................................. G06F 15/38
[52] U.S. Cl. ......................... 364/419.01; 364/419.02
[58] Field of Search ......................... 364/419; 395/145

[56] References Cited

U.S. PATENT DOCUMENTS 4,833,611  5/1989  Fukumochi et al. ............... 364/419
5,157,606  10/1992  Nagashima .......................... 364/419
5,214,583  5/1993  Miike .................................. 364/419

FOREIGN PATENT DOCUMENTS 61-262166  11/1986  Japan .

OTHER PUBLICATIONS

Saito et al., "Automatically Writing a Letter in a Foreign Language," *Symposium of the Natural Language Processing Technology*, Nov. 1984, pp. 97–106.
Hiroshi Nomiyama, "Lexical Selection Mechanism in Machine Translation Using Target Language Knowledge," *National Conference of the 42nd Information Processing Society*, 1991, pp. 3-25 and 3-26.
Akira Kumano et al., "User-cooperative Japanese Sentence Generation," *National Conference of the 42nd Information Processing Society*, 1991, pp. 3-35 and 3-36.
Minoru Ashizawa et al., "A Method of Presenting Case Categorial Ambiguity by Illustrative Sentences in Japanese-English Machine Translation by Monolingual Dialog," *National Conference of the 42nd Information Processing Society*, 1991, pp. 3-21 and 3-22.

Primary Examiner—Roy N. Envall, Jr.
Assistant Examiner—Khai Tran
Attorney, Agent, or Firm—Mason, Fenwick & Lawrence

[57] ABSTRACT

A language conversion system includes a database of expression patterns in the object language, a relevance evaluation mechanism for evaluating a relevance of each expression patterns in the object language with respect to an input in the original language, a retrieval and identification mechanism for retrieving and identifying from the input in the original language information requested by the expression pattern in the object language required to generate an output in the object language, a selection mechanism for selecting the expression pattern in the object language conforming to the input in the original language depending on the relevance evaluated in the relevance evaluation mechanism, an output mechanism for generating the output in the object language based on the required information retrieved and identified from the input in the original language by the retrieval and identification mechanism, and a control mechanism for controlling operation sequences of the relevance evaluation mechanism, the retrieval and identification mechanism, the selection mechanism and the output mechanism.

17 Claims, 11 Drawing Sheets

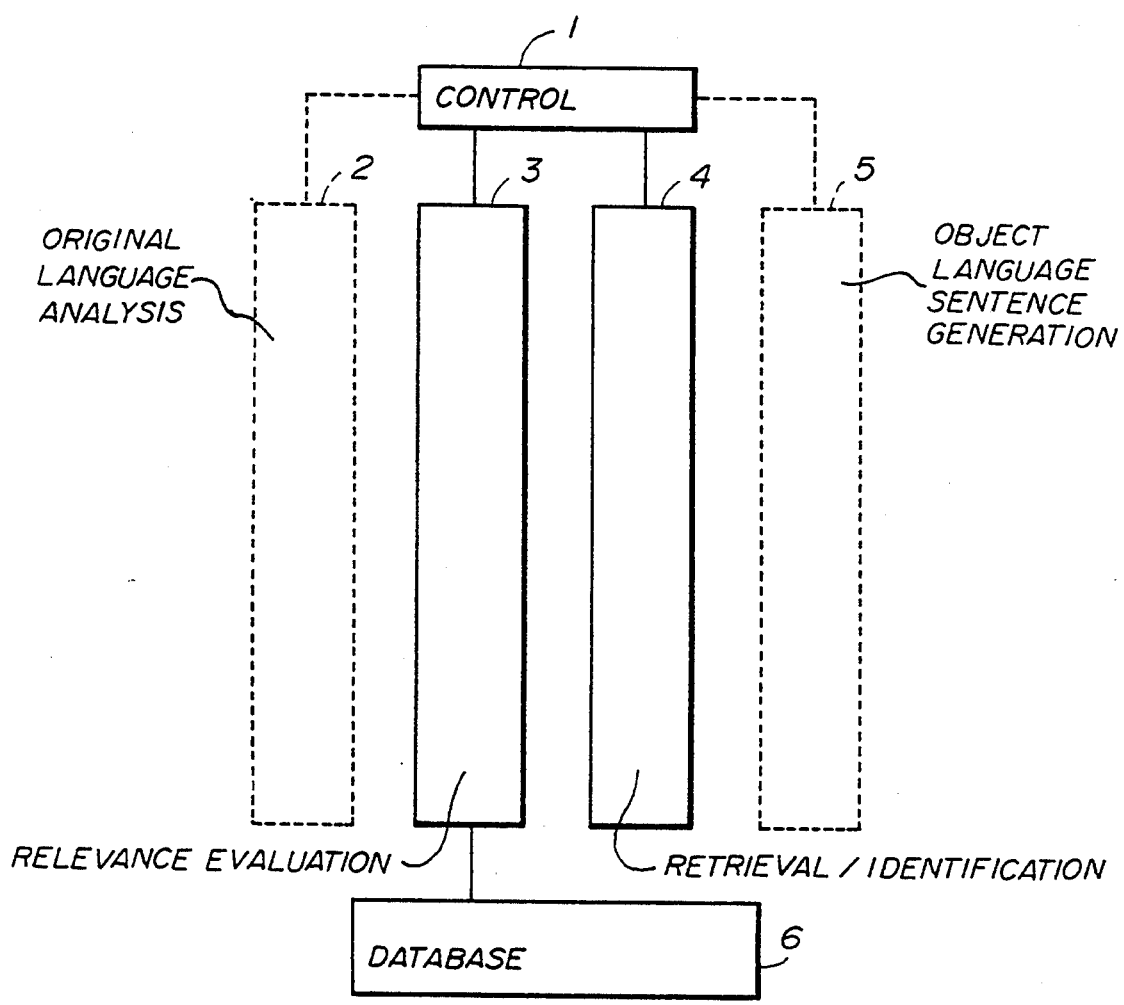

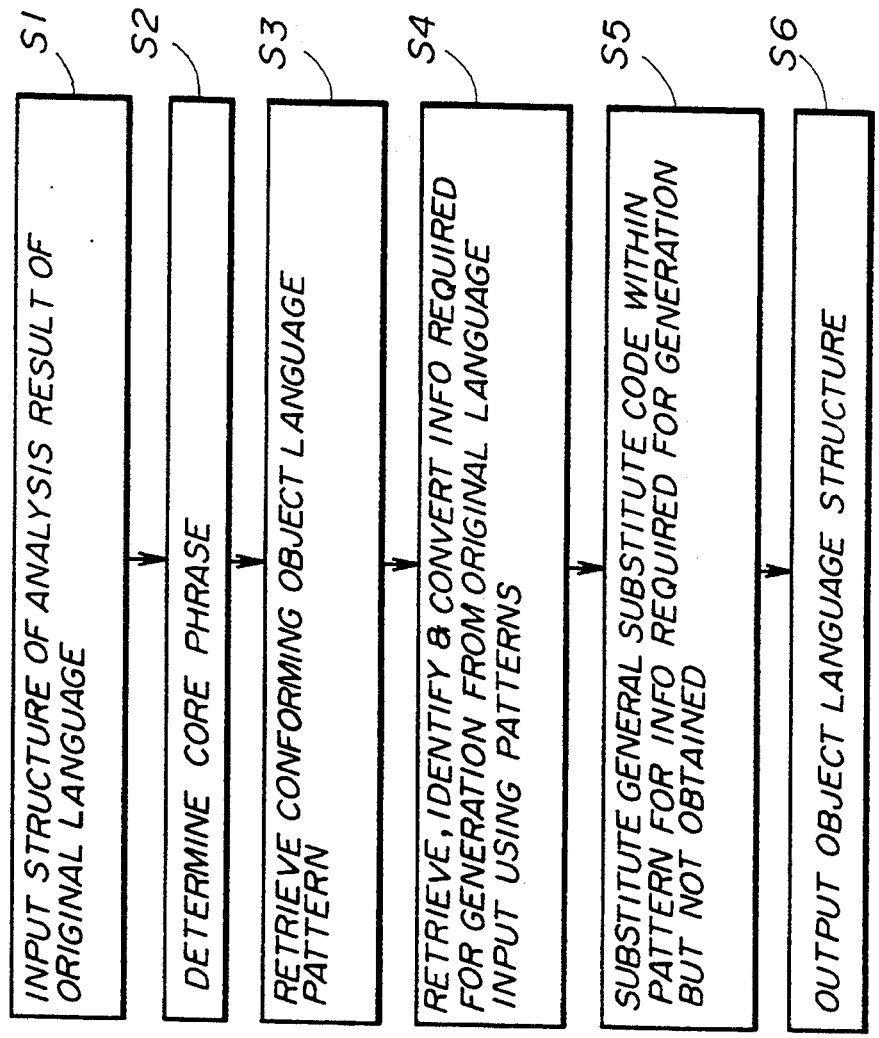

FIG. 3(a)

| ORIGINAL LANGUAGE SENTENCE: | HENDENSHO WO TAISHO NI SHITE TESUTO WO OKONATTA. |
|---|---|
| CONVENTIONAL SYSTEM TYPICAL TRANSLATION: | A TEST WAS CONDUCTED, WITH THE TRANSFORMER STATION AS THE SUBJECT.<br>TAKING A TRANSFORMER STATION AS THE SUBJECT, A TEST WAS CONDUCTED. |

FIG. 3(b)

| (1ST EMBODIMENT) TARGET PATTERN: | [(SOMEONE) CONDUCTS A TEST OF (SOMETHING) {FOR (SOME PURPOSE)}.] |
|---|---|

FIG. 3(c)

| AFTER INTRODUCING INFO OF ORIGINAL LANGUAGE: | [(SOMEONE) CONDUCTS A TEST OF (A) TRANSFORMER STATION {FOR (SOME PURPOSE)}.] |
|---|---|

FIG. 3(d)

```
⎡ SEM     OKONAU                                              ⎤
⎢ TENSE   PAST                                                ⎥
⎢              ⎡ SEM      ⎡ TESUTO SURU                  ⎤ ⎤
⎢              ⎢          ⎢ SEM    SURU                  ⎥ ⎥
⎢ WO OBJ      ⎢ PRE-SUPP ⎢ NIOJB  [SEM TAISHO]           ⎥ ⎥
⎣              ⎣          ⎣ WOOBJ  [SEM HENDESHO]        ⎦ ⎦
```

FIG. 3(e)

```
⎡ TESUTO WO OKONAU  CONDUCT A TEST                                              ⎤
⎢                                                                                ⎥
⎢ POS              TRANS VB                                                      ⎥
⎢                  ⎡ FUNCTION NAME(GA) ⎤                                        ⎥
⎢ SUBJ             ⎣ DEF SOMEONE       ⎦                                        ⎥
⎢                  ⎡ PREP OF                                                  ⎤ ⎥
⎢ PREPDO           ⎢       ⎡ SURFACE EXPRESSION (TARGET) SUPERIOR STRUCTURE ⎤ ⎥ ⎥
⎢                  ⎢ OBJ   ⎢ FUNCTION NAME (WO OBJ)                        ⎥ ⎥ ⎥
⎣                  ⎣       ⎣ DEF SOMETHING                                 ⎦ ⎦ ⎦
```

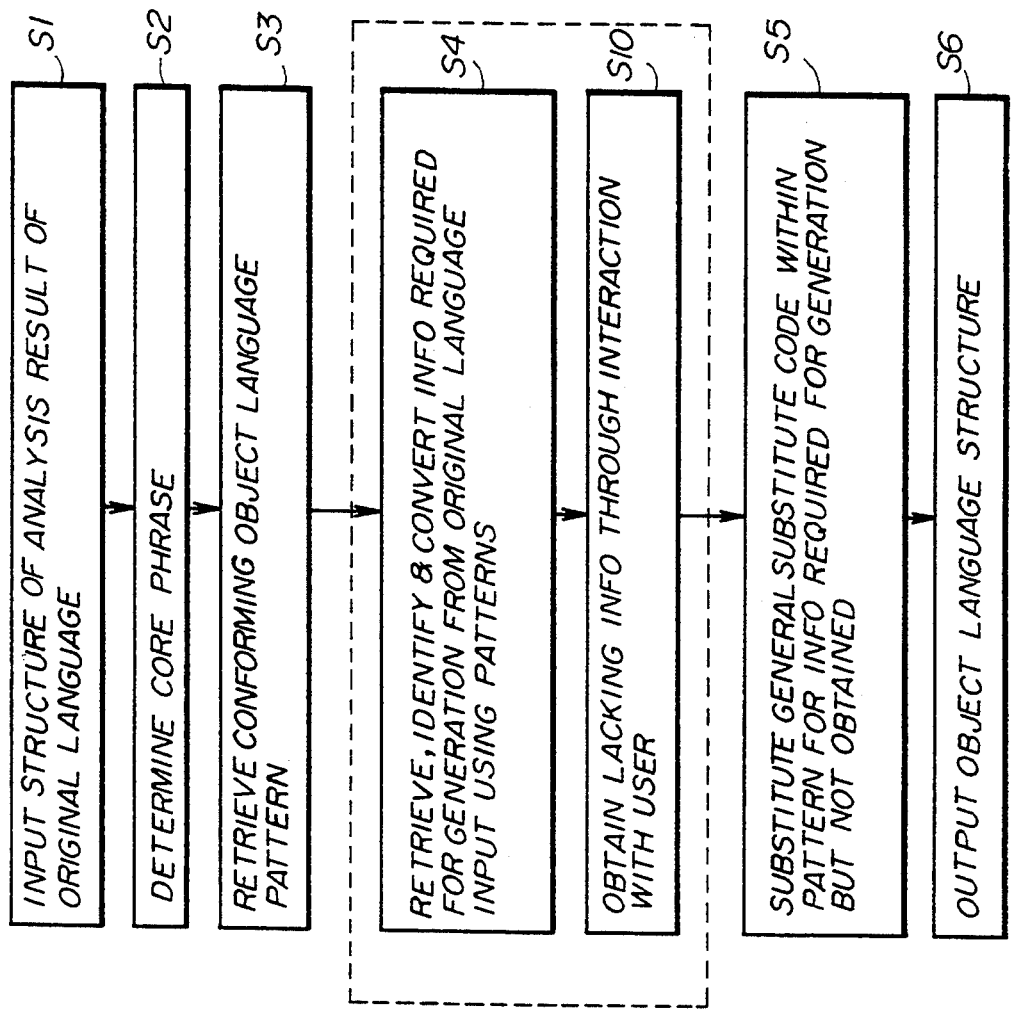

FIG. 6(a)

| | |
|---|---|
| ORIGINAL LANGUAGE SENTENCE: | HENDENSHO WO TAISHO NI SHITE TESUTO WO OKONATTA. |
| CONVENTIONAL SYSTEM TYPICAL TRANSLATION: | A TEST WAS CONDUCTED, WITH THE TRANSFORMER STATION AS THE SUBJECT.<br>TAKING A TRANSFORMER STATION AS THE SUBJECT, A TEST WAS CONDUCTED. |

FIG. 6(b)

| | |
|---|---|
| (2ND EMBODIMENT) TARGET PATTERN: | [(SOMEONE) CONDUCTS A TEST OF (SOMETHING) {FOR (SOME PURPOSE)}.] |

FIG. 6(c)

| | |
|---|---|
| AFTER INTRODUCING INFO OF ORIGINAL LANGUAGE: | [(SOMEONE) CONDUCTS A TEST OF (A) TRANSFORMER STATION {FOR (SOME PURPOSE)}.] |
| AFTER INTERACTION WITH USER: | [THE GOVERNMENT AGENCY CONDUCTED A TEST OF THE TRANSFORMERSTATION {FOR (SOME PURPOSE)}.] |

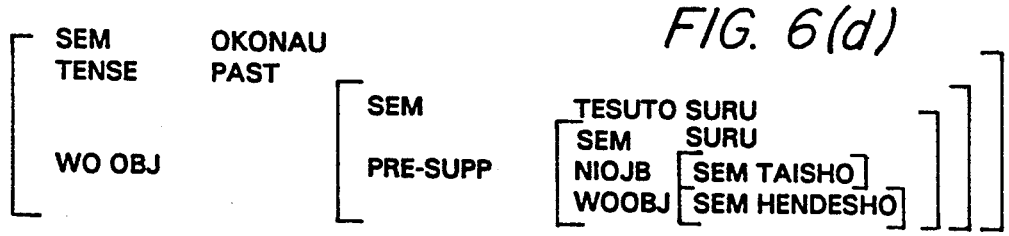

FIG. 6(d)

```
[ SEM     OKONAU
  TENSE   PAST
                    [ SEM       TESUTO SURU
                                [ SEM    SURU      ]
  WO OBJ    PRE-SUPP  NIOJB  [ SEM TAISHO ]
                      WOOBJ  [ SEM HENDESHO ] ] ]
```

FIG. 6(e)

```
[ TESUTO WO OKONAU   CONDUCT A TEST
  POS                TRANS VB
                     [ FUNCTION NAME(GA) ]
  SUBJ               [ DEF SOMEONE       ]
                     [ PREP OF
  PREPDO                    [ SURFACE EXPRESSION (TARGET) SUPERIOR STRUCTURE ]
                       OBJ  [ FUNCTION NAME (WO OBJ)                        ]
                            [ DEF SOMETHING                                 ] ]
```

FIG. 8

| FIG. 8A |
|---|
| FIG. 8B |

FIG. 8A

```
("TESUTO SURU"
    (<REQUI-AGT
        (<SUBJ AGT
            (<ALTERNATES>    ("PERSON" "TESUTO SURU HITO")
                             ("AGENCY" "TESUTO WO OKONAU SHA")
                             ("TEST CONDUCTOR" "TESUTO WO OKONAU HITO")
                             ETC
            (<FEATURES>      <SOMEONE>)
                             <NINGENSEI>
                             ETC)
            (<JAPANESE>      @GA))
        (<DIROBJ PATIENT>
            (<ALTERNATES>    ("TEST SUBJECT" "TAISHO")
                             ("TESTED" "TESTO SARETA MONO")
                             ETC
            (<FEATURES>      <SOMETHING>)
                             (@ TAISHO TO SURU @ WO)
                             (@ TAISHO NI SURU @ WO)
                             (@ TAISHO       @ NO)
            (<JAPANESE>      (@ WO          )))

(<PREFERRED>
    (<XOBJ CONDITION>
        (<ALTERNATES>        ("CONDITION" "JOTAI")
                             ("STATE" "JOTAI")
                             ("CIRCUMSTANCE" "JOKYO")
                             ETC
            (<FEATURES>      <SOMETHING>)
                             <JOTAI>
                             ETC)
            (<JAPANESE>      @ PURPOSE @ TAME NI))
        (<X-BINARY-CONTRAST
            (<ALTERNATES>    ("CONDITION A OR B" "JOTAI")
                             ("STATE A OR B"    "JOKYO")
                             (CIRCWNS TANCE A OR B "JOKYO")
```

```
(<FEATURES>            ETC
                       <SOMETHING>)
                       <JOTAI>)
 (<JAPANESE>           ETC
 (<XNNN-BOOLEAN>       @ OR @ PURPOSE @ A KA B KA
  (<ALTERNATES>        ("CONDITION A OR NOT A" "JOTAI")
                       ("STATE A OR NOT A"  "JOTAI")
                       ("CIRCUMSTANCE A OR NOT A" "JOKYO")
                       ETC
 (<FEATURES>           <SOMETHING>)
                       <JOTAI>
 (<JAPANESE>           ETC)
                       @ GIMON @ BODY @ V KA INAKA
 )
(ENGLISH PATTERNS>     (<RESTRICTIONS
 <V-TEST-001>          (@NOUN-FORM, SURFACE EXPRESSION (OKONAU))
 <V-TEST-002)          -SUPERIOR STRUCTURE-FUNCTION NAME (WO OBJ))
                       (<RESTRICTIONS>  <XOBJ-CONDITION>)
                       (<RESTRICTIONS>  <XNNN-BINARY-CONTRAST>)
                       (<RESTRICTIONS>  <XNNN BOOLEAN>)
                       (<RESTRICTIONS>  <XOBJ CONDITION>)
 (<V-TEST-003>         (<RESTRICTIONS>  @MEISHIKA  <XOBJ-CONDITION>)
 (<V-TEST-001>         (<RESTRICTIONS>  @MEISHIKA  <XNNN-BINARY CONTRAST>)
 (<V-TEST-002>         (<RESTRICTIONS>  @MEISHIKA  <XNNN-BOOLEAN>))
 (<V-TEST-003>
```

```
(<V- TEST -000>

(<PATTERN>      ( TEST <SOMETHING>))
    (<EXAMPLE>      "TEST(TEST-SUBJECT)" [SUBJ = WO KAKU]
       OF           "TEST FOR (CONDITION) [COND = WO KAKU])
    (<COMPONENT> (X           <DIROBJ - PATIENT>))
    )

(<V- TEST -001>

(<PATTERN>      ( TEST <SOMETHING>(P - FOR - 001>))
    (<EXAMPLE>      "TEST(TEST-SUBJECT)" FOR STATE/CONDITION)")
    (<COMPONENT> (X           <DIROBJ PATIENT>)
                 (X1 X2       <XOBJ CONDITION>)
    )

(<V- TEST -002>
    (<PATTERN>      (CONDUCT<N- TEST -002>)
                    (CONDUCT<N- TEST -003>))
    (<EXAMPLE>      "CONDUCT A TEST OF (TEST-SUBJ) TO DETERMINE (A OR
    )                                                              B)"

(<V- TEST -003>
    (<PATTERN>      (MAKE<N TEST - 001>))
    (<EXAMPLE>      "MAKE A TEST OF (TEST-SUBJECT)FOR(STATE/
    )                                                CONDITION)")

(<N- TEST -001>
    (<PATTERN>      ( TEST (<P- OF -001>) (<P- FOR -001>))
    (<EXAMPLE>      "A TEST OF(TEST-SUBJ)FOR(STATE/CONDITION)")
    (<COMPONENT> ((X1 X1)    <DIROBJ-PATIENT>)
                 ((X2 X1)    <XOBJ-CONDITION>)
    )

(<N- TEST -002>
    (<PATTERN>      ( TEST (<P- OF -001>) (VINF- TO DETERMINE -002>))
    (<EXAMPLE>      "A TEST OF(TEST-SUBJ)TO DETERMINE(A OR B)")
    (<COMPONENT> ((X1 X1)    <DIROBJ-PATIENT>)
                 ((X2 X1)    <XNNN BINARY CONTRAST>))
    )

(<N- TEST -003>
    (<PATTERN>      ( TEST (<P- OF -001>) (VINF- TO DETERMINE -001>))
    (<EXAMPLE>      "A TEST OF(TEST-SUBJ)TO DETERMINE(WHETHER
    (<COMPONENT> ((X1 X1)    <DIROBJ-PATIENT>)           A OR B)")
                 ((X2 X1)    <XNNN BOOLEAN>))
```

FIG. 10(a)

| | |
|---|---|
| ORIGINAL LANGUAGE SENTENCE: | HENDENSHO WO TAISHO NI SHITE TESUTO WO OKONATTA. |
| CONVENTIONAL SYSTEM TYPICAL TRANSLATION: | A TEST WAS CONDUCTED, WITH THE TRANSFORMER STATION AS THE SUBJECT.<br>TAKING A TRANSFORMER STATION AS THE SUBJECT, A TEST WAS CONDUCTED. |

FIG. 10(b)

| | |
|---|---|
| (4TH EMBODIMENT) TARGET PATTERN: | (SOMEONE) CONDUCTS A TEST OF (SOMETHING) {TO DETERMINE (SOME CONDITION A OR B)}. |

FIG. 10(c)

| | |
|---|---|
| AFTER INTRODUCING INFO OF ORIGINAL LANGUAGE: | (SOMEONE) CONDUCTS A TEST OF (A) TRANSFORMER STATION {TO DETERMINE (SOME CONDITION A OR B)}. |

FIG. 10(d)

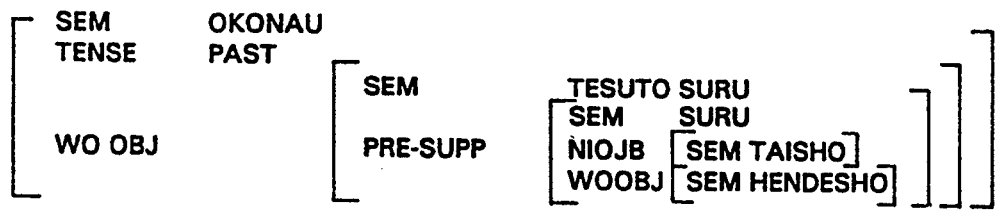

INTERACTIVE LANGUAGE CONVERSION SYSTEM

BACKGROUND OF THE INVENTION

The present invention generally relates to language conversion systems, and more particularly to an interactive language conversion system for a machine translation system.

The existing machine translation systems do not have sufficient knowledge to automatically make correct translations. Hence, interactive systems have been proposed to compensate for the lack of knowledge by making inquiries to the user.

According to the popular systems employed in the conventional machine translation systems, the original (or source) language is analyzed to obtain a result (tree structure), the original language is converted into the tree structure of the object language in parts based on this result, and the object language is generated based on this conversion. This conversion system is sometimes referred to as the forward propagation structure conversion system. In addition, various systems have been proposed which eliminate the fuzziness by making inquiries to the user in this forward propagation structure conversion system. Examples of such systems which eliminate the fuzziness are proposed in Ashizawa et al., "A Method of Presenting Case Categorial Ambiguity by Illustrative Sentences in Japanese-English Machine Translation by Monolingual Dialogue", National Conference of the 42nd Information Processing Society (First Term of 1991) and Kumano et al., "User-Cooperative Japanese Sentence Generation" National Conference of the 42nd Information Processing Society (First Term of 1991).

On the other hand, several conversion systems have been proposed which do not use an original language input in a collective form and obtain all information through inquiries to the user. An example of such a conversion system is proposed in Saito et al., "Automatically Writing a Letter in a Foreign Language", Symposium of the Natural Language Processing Technology, November 1984.

In addition, in the forward propagation structure conversion system described above, there is also a proposal to use the knowledge of the object language for the selection of the translated word. An example of such a system is proposed in H. Nomiyama, "Lexical Selection Mechanism in Machine Translation Using Target Language Knowledge", National Conference of the 42nd Information Processing Society (First Term of 1991).

Furthermore, there are proposed systems which prepare a large number of examples of translated sentences in advance, and retrieve a translation which includes an original language phrase which is closest to the original language input. In this case, only the difference between the original language input and the original language sentence within the translation is converted, and the translated sentence within the translation is modified depending on the result of the conversion.

The popular conventional system converts the analysis (tree structure) of the original language into the tree structure of the object language in parts, and generates the object language. According to this system, even if the lack of knowledge is compensated for by the interaction with the user, the system tends to take a original-language-based structure. As a result, the sentence form is unnatural for the object language, and the expression is unnatural.

On the other hand, in the system which obtains all the information through inquiries with the user, it is necessary to prepare an extremely large amount of data in order to cope with a wide range of documents. In addition, the operation is machine initiated from the beginning and makes the user feel under control of the machine.

The information required in the object language is very often missing in the sentence of the original language. For this reason, the system in which there is no interaction with the user tends to frequently generate incomplete output.

Moreover, the information necessary in the object language may not exist in the original sentence. According to the conventional system, the translation is in many cases completed by supplementing such necessary information by a default process. However, erroneous information may be added and necessary information may be dropped if the default process is insufficient, and this method tends to generate an unnatural translation.

On the other hand, according to the translation system which uses the examples of translated sentences, an extremely large amount of examples of translated sentences must be prepared in order to cope with a wide range of documents.

SUMMARY OF THE INVENTION

Accordingly, it is a general object of the present invention to provide a novel and useful language conversion system in which the problems described above are eliminated.

Another and more specific object of the present invention is to provide a language conversion system for converting an original language into an object language by a computer, comprising a database of expression patterns in the object language, relevance evaluation means, coupled to the database, for evaluating the relevance of each expression pattern in the object language with respect to the input in the original language, retrieval and identification means for retrieving and identifying from the input in the original language information requested by the expression pattern in the object language required to generate an output in the object language, selection means for selecting the expression pattern in the object language conforming to the input in the original language depending on the relevance evaluated in the relevance evaluation means, output means for generating the output in the object language based on the required information retrieved and identified from the input in the original language by the retrieval and identification means, and control means, coupled to the relevance evaluation means, the retrieval and identification means, the selection means and the output means, for controlling operation sequences thereof. According to the language conversion system of the present invention, it is possible to generate with ease a more appropriate and natural translation compared to the conventional forward propagation structure conversion system. In addition, the amount of data required for the translation is small compared to that required in the conventional system which stores examples of translated sentences.

Still another object of the present invention is to provide a language conversion system of the type described above which further comprises inquiry means, coupled to the control means, for obtaining the required information through inquiries to a user, and wherein the output means generates the output in the original language based on a combination of the required information which is retrieved and identified by the retrieval and identification means and the required information obtained by the inquiry means. According to the language conversion system of the present invention, the user will not feel as if he is under the control of the language conversion system, and the generation of an incomplete output is suppressed. In addition, the amount of data required for the translation is small compared to the conventional system which obtains all of the information through inquiries to the user.

A further object of the present invention is to provide a language conversion system of the type described first wherein the database includes in the expression patterns essential elements which are essential and possibly omittable elements which may possibly be omitted, and treats a plurality of expression patterns differing only in the possibly omittable elements as a single expression pattern. According to the language conversion system of the present invention, the utilization efficiency of the memory capacity and the processing efficiency of the system are improved because the expression patterns which only differ in the possibly omittable elements are treated as a single expression pattern.

Another and more specific object of the present invention is to provide a language conversion system of the type described second wherein the relevance evaluation means and the retrieval and identification means are realized by a predetermined database which can easily be modified and interpreting and applying means for interpreting and applying the predetermined database, the predetermined database includes information for evaluating the relevance of the expression patterns in the object language with respect to the input in the original language and information for retrieving and identifying the required information from the input in the original language, and the interpreting and applying means selects the expression patterns in the object language conforming to the input in the original language through interpretation and application of the information contained in the predetermined database and retrieves and identifies the required information from the input in the original language through the interpretation and application. According to the language conversion system of the present invention, it is possible to continuously improve the performance of the system.

Other objects and further features of the present invention will be apparent from the following detailed description when read in conjunction with the accompanying drawings.

BRIEF DESCRIPTION OF THE DRAWINGS

FIG. 1 is a system block diagram showing a first embodiment of a language conversion system according to the present invention;

FIG. 2 is a flow chart for explaining the operation of the first embodiment;

FIGS. 3(a)–3(b) show an example of a language with a conversion made in the first embodiment in comparison with a conventional case;

FIG. 5 is a flow chart for explaining the operation of the second embodiment;

FIGS. 6(a)–6(e) show an example of a language conversion made in the second embodiment in comparison with a conventional case;

FIGS. 8(a) and 8(b) are collectively referred to as FIG. 8 which shows an example of the data which describes evaluating information and retrieval and identification information for explaining the operation of a fourth system embodiment of the language conversion system according to the present invention;

FIG. 9 shows a format of the English sentence pattern dictionary used in the fourth embodiment; and FIGS. 10(a)–10(d) show an example of a language conversion made in the fourth embodiment in comparison with a conventional case.

DESCRIPTION OF THE PREFERRED EMBODIMENTS

Figure 4:
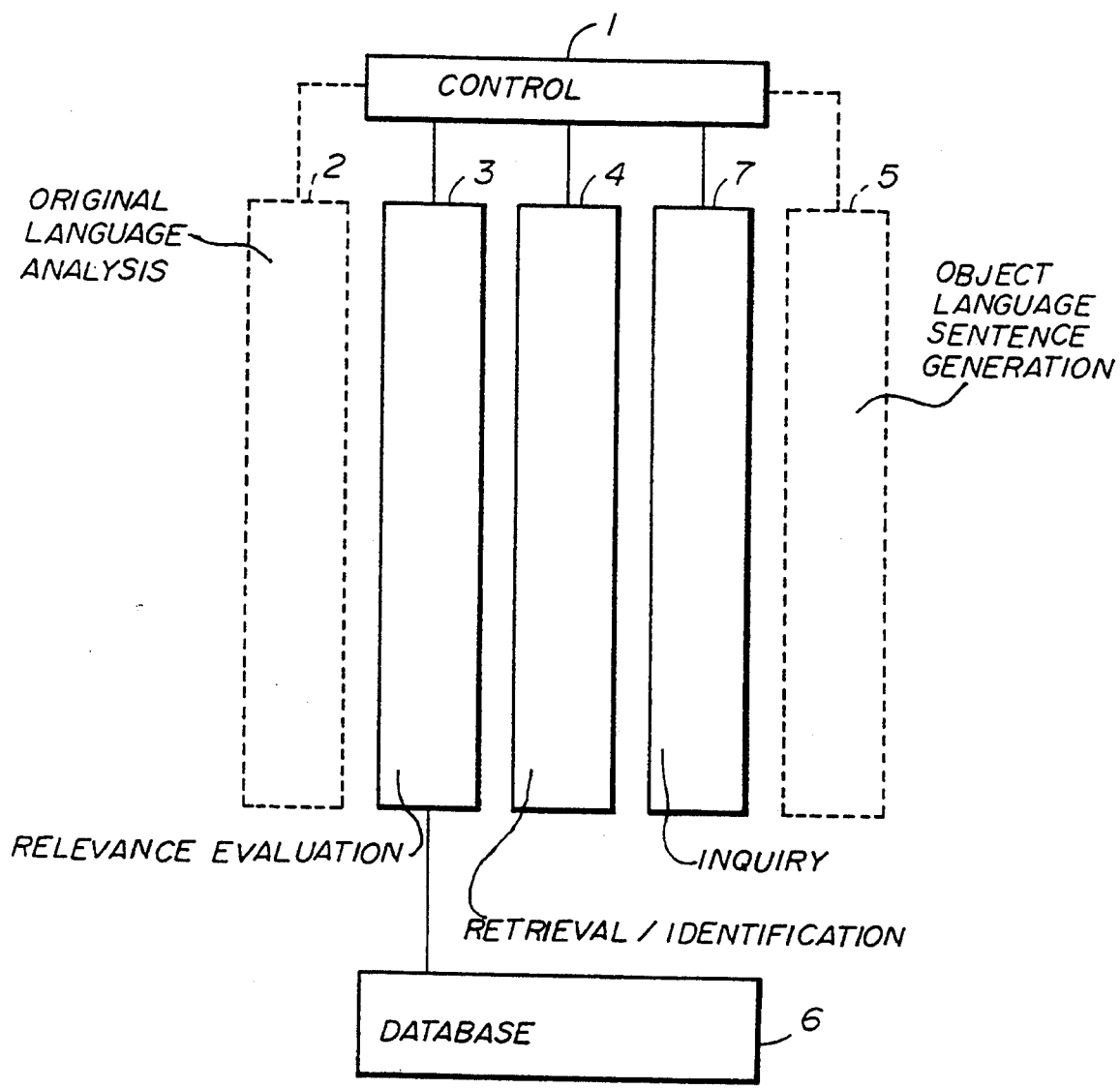
FIG. 4 is a system block diagram showing a second embodiment of the language conversion system according to the present invention.

FIG. 1 shows a first embodiment of a language conversion system according to the present invention. In FIG. 1, the language conversion system includes a control mechanism 1, an original language analysis mechanism 2, a relevance evaluation mechanism 3, a retrieval and identification mechanism 4, an object language sentence generation mechanism 5 and an object language pattern database 6 which are connected as shown.

The object language pattern database 6 stores expression patterns of the object language. The relevance evaluation mechanism 3 evaluates the relevance of the object language patterns within the object language pattern database 6 with respect to the original language input, and selects the object language patterns which have the highest relevance as a result of the evaluation. Next, the retrieval and identification mechanism 4 retrieves and identifies from the original language input the information which is required by the selected object language pattern in order to generate the object language output. The original language analysis mechanism 2 may be provided to obtain the original language input from a character string of the original language sentence or, the process of analyzing the original language may be carried out externally to obtain the original language input from the result of this analysis. Similarly, the object language sentence generation mechanism 5 may be provided to obtain the object language output from a character string of the object language sentence or, the process of generating the object language sentence may be carried out externally to obtain the object language output from the object language structure.

The control mechanism 1 controls the operation sequences of said original language analysis mechanism 2, the relevance evaluation mechanism 3, the retrieval and identification mechanism 4 and the object language sentence generation mechanism 5.

FIG. 2 is a flow chart for explaining the operation of this first embodiment. In FIG. 2, a step S1 inputs the structure of the analysis result of the original language, and a step S2 determines the core phrase. A step S3 retrieves the relevant object language patterns. A step S4 uses the retrieved object language patterns to retrieve, identify and convert the information necessary for the generation from the original language input. A step S5 substitutes a general substitute code for the information necessary for generation but which was not obtained from the object language patterns. A step S6 outputs the object language structure.

In this case, it is assumed for the sake of convenience that the original language analysis mechanism 2 and the object language sentence generation mechanism 5 are externally provided. The structural analysis of the original sentence is taken as the input and the word or phrase which serves as the core meaning of the original sentence is determined. Based on this core phrase, the object language patterns which conform thereto are retrieved from the object language pattern database 6. The patterns which are retrieved are used to retrieve from the original sentence structure the information required by the object language patterns, so as to convert the structure into the structure of the object language. If the required information cannot be obtained, it is possible to cope with the missing information by a later-process such as the process of converting the active voice into the passive voice, but such a process tends to lose the natural sentence structure of the object language sentence. For this reason, if the required information is missing, it is better to output the natural sentence structure even though the information is missing and the sentence is incomplete. The natural sentence structure is easier for the user to understand particularly if the object language is the native language of the user. On the other hand, if the user is unskilled at the object language, the user will be made aware of the missing information and thus facilitate education of the user with regard to the information missing in the object language. In this embodiment, the missing information is substituted by the general substitute code within the object language pattern.

FIGS. 3(a)–3(e) show an example of a language conversion made in the first embodiment in comparison with a conventional case. In FIG. 3(a) shows an example of an input sentence and a typical translation obtained according to the conventional system, FIG. 3(b) shows an object pattern of this embodiment which can be read by the user, FIG. 3(c) shows an intermediate output of this embodiment, FIG. 3(a) shows an example of the analysis-structure of the original language sentence, and FIG. 3(e) shows an example of the object language pattern database. In this example of the language conversion, the original language is Japanese and the object language is English. The operation of this embodiment will now be described with reference to this example of the language conversion.

When the sentence structure analysis is made with respect to the original language sentence "hendensho wo taisho ni shite tesuto wo okonatta", the structure shown in FIG. 3(d) is obtained. This original language sentence means "a test was (or tests were) conducted on a transformer station (or transformer stations)". As indicated by this structure, the word "okonau" forms the core of the original sentence from the point of view of the sentence structure, but the phrase "tesuto wo okonau" may be regarded as being the core from the point of view of the meaning. In this embodiment, the phrase which forms the core from the point of view of the meaning will be referred to as the "core phrase". The core phrase is determined from the structure which is input.

Then, the object language pattern having the highest relevance for the core phrase which has been determined is retrieved from the object language pattern database shown in FIG. 3(e). In this example, the object pattern [(Someone) conducts a test of (something) {for (some purpose)}] shown in FIG. 3(b) has the highest relevance. The words in parenthesis " " such as the words "(Someone)" and "(something)", are called the "general substitute code" in this embodiment. The general substitute code is information necessary when generating the object language output based on the object language pattern. It is possible to make an object sentence which is correct from the point of view of the sentence structure even if the words in curly brackets "{ }" are omitted, but it is possible to make an object language sentence which is more complete and natural by not omitting these words.

Retrieval keys for retrieving and identifying each piece of required information from the analyzed structure of the original language sentence which is the original language input are described in the object language pattern database as shown in FIG. 3(e), and the required information is retrieved using its retrieval key. The object language pattern which corresponds to "tesuto wo okonau" is "conducts a test". In addition, one piece of required information retrieves [SEM hendensho]-from the object language using the retrieval key [surface expression (target) - superior structure-function name (wo object)], and a conversion is made to the structure of the object language. By contrast, the subject is also required information, but the corresponding information is not present in the structure of the original language. Hence, "Someone", used as the general substitute code, is employed instead. As shown in FIG. 3(c), the output result is the object language sentence corresponding to the pattern [(Someone) conducted a test of a transformer station {for (some purpose)}.].

When retrieving the language structure, (grammatical or semantic) function names such as "SEM (sem)" and "object (wo obj)" which are sub-structure labels, are generally used to successively manage the direct sub-structure. This embodiment can also employ this retrieval method, but this embodiment permits a surface string, such as "subject", to be specified as the retrieval key because it makes the data description much easier. In this case, if the plurality of retrieval keys are ordered as in the example described above, the sub-structure which is obtained by using the first retrieval key may be used as the new retrieval range, and retrieval by the remaining retrieval keys can successively be repeated.

FIG. 4 shows a second embodiment of the language conversion system according to the present invention. In FIG. 4, those parts which are the same as those corresponding parts in FIG. 1 are designated by the same reference numerals, and a description thereof will be omitted.

In FIG. 4, the language conversion system includes an inquiry mechanism 7 in addition to the mechanisms 2 through 5 and the object language pattern database 7.

The object language pattern database 6 stores expression patterns of the object language. The relevance evaluation mechanism 3 evaluates the relevance of the object language patterns within the object language pattern database 6 with respect to the original language input, and selects the object language patterns which have the highest relevance as a result of the evaluation. Next, the retrieval and identification mechanism 4 retrieves and identifies from the original language input the information which is required by the selected object language pattern in order to generate the object language output or, the inquiry mechanism 7 may make an inquiry to the user with regard to the required information. The original language analysis mechanism 2 may be provided to obtain the original language input from a character string of the original language sentence or, the process of analyzing the original language may be carried out externally to obtain the original language input from the result of this analysis. Similarly, the object language sentence generation mechanism 5 may be provided to create the object language output as a character string of the object language sentence or, the process of generating the object language sentence may be carried out externally to create the object language output from an object language structure.

FIG. 5 is a flow chart for explaining the operation of this second embodiment. In FIG. 5, those steps which are the same as those corresponding steps shown in FIG. 2 are designated by the same reference numerals. In FIG. 5, a step S1 inputs the structure from the analysis result of the original language, and a step S2 determines the core phrase. A step S3 retrieves the relevant object language patterns. A step S4 uses the retrieved object language patterns to retrieve, identify and convert the information required for the generation from the original language input. A step S10 obtains the missing information through interaction with the user. A step S5 substitutes a general substitute code for the information required for the generation but not obtained. A step S6 outputs the object language structure.

In this case, it is assumed for the sake of convenience that the original language analysis mechanism 2 and the object language sentence generation mechanism 5 are externally provided. The structural analysis of the original sentence is taken as the input and the word or phrase which becomes the core of the original sentence from the point of view of the meaning thereof. Based on this core phrase, the object language patterns which conform thereto are retrieved from the object language pattern database 6. The patterns which are retrieved are used to retrieve and identify the information required by the object language patterns from the structure of the original sentence or through inquiries made to the user, so as to convert the structure into the structure of the object language. If the required information still cannot be obtained, a general substitute code from the object language pattern is substituted for the missing information.

Various combinations of the retrieval and identification from the original language input and the inquiries made to the user are possible. If the inquiry to the user is of higher priority, the authenticity of the obtained information improves but the user must bear the burden of making troublesome operations. For this reason, the retrieval and identification from the original language input should be of higher priority so as to reduce unnecessary inquiries. Regardless of whether the inquiry is made to the user every time the required information cannot be obtained by the retrieval and identification from the original language input or the contents of the inquiries are stored in advance and the stored inquiries are made collectively after the next retrieval and identification operation is made, it is possible to reduce the number of unnecessary inquiries compared to the case where the inquiries are made first. If the inquiry is made to the user every time the required information cannot be obtained by the retrieval and identification from the original language input, the process is efficient and simple because there is no need to store the contents of the inquiries before making the next retrieval and identification operation. On the other hand, if the contents of the inquiries are stored in advance and the stored inquiries are made collectively after the next retrieval and identification operation is made, it is possible to use all information obtained by the retrieval and identification from the original language input (including all information obtained through previous inquiries) at the point in time when the inquiry is made. Hence, in this latter case, it is possible to further reduce the number of unnecessary inquiries and also make the inquiries in a form which is easy for the user to answer.

FIGS. 6(a)-6(e) show an example of a language conversion made in the second embodiment in comparison with the conventional case. In FIG. 6(a) shows an example of an input sentence and a typical translation obtained according to the conventional system, FIG. 6(b) shows an object pattern of this embodiment which can be read by the user, FIG. 6(c) shows an intermediate output of this embodiment, FIG. 6(d) shows an example of the analysis structure of the original language sentence, and FIG. 6(e) shows an example of the object language pattern database. In this example of the language conversion, the original language is Japanese and the object language is English. The operation of this embodiment will now be described with reference to this example of the language conversion.

When the sentence structure analysis is made with respect to the original language sentence "hendensho wo taisho ni shite tesuto wo okonatta", the structure shown in FIG. 6(d) is obtained. This original language sentence means "a test was (or tests were) conducted on a transformer station (or transformer stations)". As indicated by this structure, the word "okonau" forms the core of the original sentence from the point of view of the sentence structure, but the phrase "tesuto wo okonau" may be regarded as being the core from the point of view of the meaning. In this embodiment, the phrase which forms the core from the point of view of the meaning will be referred to as the "core phrase". The core phrase is determined from the structure which is input.

Then, the object language pattern having the highest relevance to the core phrase which has been determined is retrieved from the object language pattern database shown in FIG. 6(e). In this example, the object pattern [(Someone) conducts a test of (something) {for (some purpose)}] shown in FIG. 6(b) has the highest relevance. The words in parenthesis " ", such as the words "(Someone)" and "(something)", are called the "general substitute code" in this embodiment. The general substitute code is required information for generating the object language output based on the object language pattern. It is possible to make an object sentence which is grammatically correct even if the words in curly brackets "{ }" are omitted, but it is possible to make an object language sentence which is more complete and natural by not omitting these words.

Retrieval keys for retrieving and identifying each piece of required information from the analyzed structure of the original language sentence which is the original language input are described in the object language pattern database as shown in FIG. 6(e), and the necessary information is retrieved using its retrieval key. The object language pattern which corresponds to "tesuto wo okonau" is "conducts a test". In addition, one piece of required information finds [SEM hendensho] using the retrieval key [surface expression (target)-superior structure - function name (wo object)] directly in the object language, and a conversion is made to the structure of the object language. On the other hand, the subject is also required information, but corresponding information does not exist in the structure of the original language. Hence, an inquiry is made to the user to obtain the subject which is "the government agency".

The question made by this inquiry may be "(Someone) at the subject part of ' (Someone) conducts a test of (something) {for (some purpose) }.' is unknown. Who ' conducts the test (tesuto wo okonau) '?", for example. The question may also be "(Someone) at the subject part of ' (Someone) conducted a test of (a) transformer station { for (some purpose) }.' is unknown. Who ' conducts the test of the transformer station (hendensho no tesuto wo okonau )'?". Next, an inquiry is made with regard to the article of the "transformer station" so as to obtain the final output result. The general substitute code is employed in place of the missing information which could not be obtained by the inquiry or the missing information for which no inquiry was made. As shown in FIG. 6(c), the output result becomes the object language sentence corresponding to the pattern [The government agency conducted a test of the transformer station {for (some purpose) }.].

In this embodiment, the conversion from the original language to the object language is made by a computer by use of the object language pattern database 6, the relevance evaluation mechanism 3 which evaluates the relevance of the object language patterns within the object language pattern database 6 with respect to the original language input, and the retrieval and identification mechanism 4 which retrieves and identifies from the original language input the information which is required by the object language pattern in order to generate the object language output. The object language output is generated by the language conversion system by selecting the object language pattern and obtaining the required information through retrieval and identification of the original language input or through inquiries to the user.

When expressing information in a certain expression of a language, several types of information exist. In other words, there is information essential for the expression, and there is information which is not essential but may make the expression unnatural or difficult to understand if missing, and there is information which is not required but can make the meaning more detailed by its addition, and there is less important information which may be added but does not alter the expression greatly even when added, and there is excessive information which may be added but may make the expression unnatural or difficult to understand if added. For example, if an attempt is made to express "hendensho wo taisho ni shite tesuto wo okonatta" in English, "'who' conducted the test" is essential, and "'for what purpose' the test was conducted" is important from the point of view of facilitating the understanding. On the other hand, distinguishing politeness in Japanese expressions such as "okonatta" and "okonaimashita" may be regarded as excessive information. According to the object language initiated language conversion system described above, the object language output is generated by obtaining the information required by the object language pattern from the original language input and/or the user, and it is possible to obtain natural object language output by eliminating the less important additional information and the surplus additional information. However, among the additional information which are not essential in the object language expression, there are a large number of possible combinations of additional information to be added or of additional information to be omitted, and it is uneconomical not only from the point of view of the efficient use of the memory capacity but also from the point of view of the processing efficiency if all combinations are stored as independent patterns. Furthermore, it would be difficult to respond flexibly according to the significance of the additional information.

Next, a description will be given of a third embodiment of the language conversion system in which the above problems are eliminated. The basic structure and process sequence are similar to those of the second embodiment, and this third embodiment will thus be described with reference to an example of the language conversion.

For the sake of convenience, it is assumed that the original language is Japanese, the object language is English, and the original language input "hendensho wo taisho to shite tesuto wo okonatta" is to be converted. The English pattern in this case is basically "<SOMEONE> conducts a test of <SOMETHING>", but additional information such as "<FOR SOME PURPOSE>", "<SOMEHOW>" and "<SOMETIME>" may be added to this pattern. If the patterns obtained by adding each of such additional information are treated as independent patterns, the number of patterns becomes extremely large. Hence, in this embodiment, the patterns are treated as a single pattern including structural elements which may be omitted.

In addition, even among the structural elements which may be omitted, the expression sounds unstable if "<FOR SOME PURPOSE>" is omitted, but the expression does not necessarily sound unstable even if "<SOMETIME>" is omitted Accordingly, the possibility of omitting the structural elements of the pattern, including the essential element such as the subject "<SOMEONE>", may be categorized into three levels, for example. In this embodiment, the three levels are the "required" level such as the omission possibility level for the word "<SOMEONE>", the "preferred" level such as the omission possibility level for the words "<FOR SOME PURPOSE>", and the "optional" level such as the omission possibility level for the word "<SOMETIME>".

Figure 7:
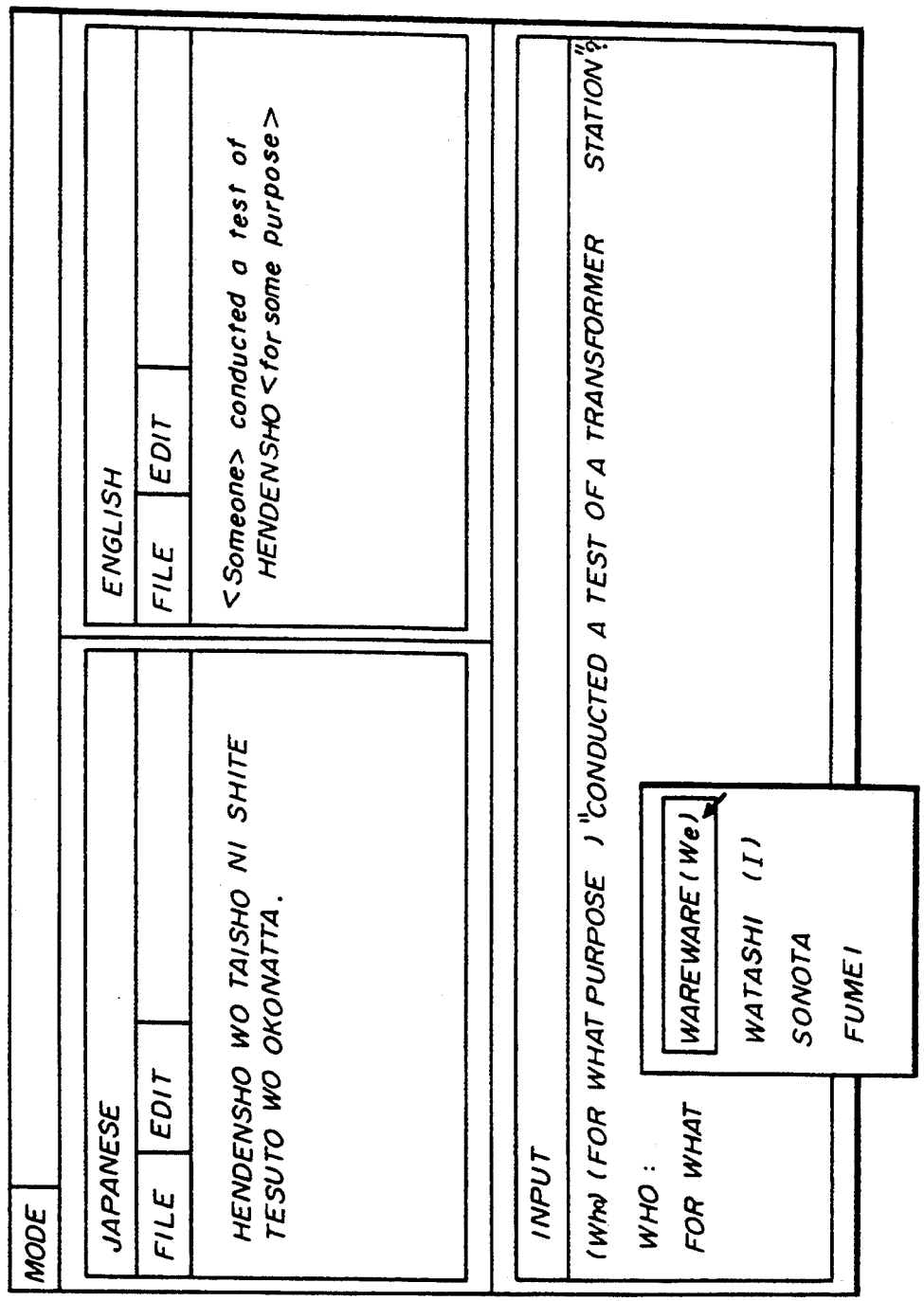
FIG. 7 shows an example of a display for explaining the operation of a third embodiment of the language conversion system according to the present invention.

If the structural elements of the pattern cannot be obtained, the system may (i) make an inquiry to the user, (ii) continue the present process by regarding the element as an unknown, (iii) neglect the element and the like, and the behavior of the system may be selected by the control mechanism 1 depending on the omission possibility level described above. In this example, the only structural element which can be obtained from the original language input is "hendensho" which corresponds to "<SOMETHING>" and the processing of the other structural elements which cannot be obtained is determined depending on the omission possibility level. For example, an inquiry is made to the user with regard to the structural elements having the "required" or "preferred" level as shown in FIG. 7, and the processing is continued by regarding the structural elements having the "optional" level as being unknowns. Of course, an inquiry may be made only with regard to the structural elements having the "required" level, and the processing may be continued by regarding the structural elements having the "preferred" or "optional" level as being unknowns. The kind of inquiry and which omission possibility level of the structural element regarded as unknown may be specified arbitrarily by the user.

Even if some structural elements finally cannot be obtained, the output is generated including general substitute code such as "<SOMEONE>" depending on the omission possibility levels. The substitutes indicate important structural elements which are missing such as structural elements having "required" or "preferred" omission possibility level. On the other hand, the structural elements having the "optional" omission possibility level are neglected. Of course, it is possible to only indicate the missing structural elements having the "required" omission possibility level and neglect the structural elements having the "preferred" and "optional" omission possibility levels.

In the above described embodiment, the relevance evaluation mechanism 3 which evaluates the relevance of the object language patterns within the object language pattern database 6 with respect to the original language input, and the retrieval and identification mechanism 4 which retrieves and identifies from the original language input the information which is required by the object language pattern in order to generate the object language output, are realized by a database which can easily be modified and a means for interpreting and applying the database. In addition, the information indicating the omission possibility level of each structural element is added to the object language expression pattern.

However, if it is difficult to modify the relevance evaluation mechanism 3 and the retrieval and identification mechanism 4, it becomes difficult to continuously improve the performance of the language conversion system.

If the information indicating the omission possibility level of each structural element is added to each object language expression pattern, the same information (data) may be added to different expression patterns having approximately the same meaning. As a result, the utilization efficiency of the memory capacity is uneconomical in this case, and furthermore, it is difficult to modify the information ( data ).

Next, a description will be given of a fourth embodiment of the language conversion system according to the present invention which eliminates the above described problems. The basic structure and process sequence are similar to those of the third embodiment, and this fourth embodiment will thus be described with reference to an example of the language conversion.

For the sake of convenience, it is assumed that the original language is Japanese and the object language is English. FIG. 8 shows an example of the data which describes the information for evaluating the relevance of the expression patterns and the original language input, and the information for retrieving and identifying from the original language input the information required by the object language pattern in order to generate the object language output.

The data shown in FIG. 8(a) and 8(b) are collectively referred to as FIG. 8 which will hereinafter be referred to as the "Japanese-English required information patterns". The Japanese-English required information patterns are used by (1) the means for retrieving English patterns conforming to the core phrase which forms the core from the point of view of the meaning of the Japanese input, and (2) the means for retrieving and identifying the information required for the generation of English from the Japanese input. A description will now be given of the structural formats of the kinds of information for the respective means.

1. In order to retrieve the English pattern conforming to the core phrase, there are sub-structures with the label <English-Patterns>. A cross-reference of the pattern in the English sentence pattern dictionary exists in each sub-structure with the label <English-Patterns>, and there also exists the condition for selecting a most applicable element within <English-Patterns>. For example, if the element <v-test-002> is used, the English verbal phrase "conduct a test" is generated, but in the Japanese input the verb "tesuto suru" is a noun, and the case where "okonau" is a verbal phrase may be considered appropriate. This is described by the <Restrictions> with respect to the <v-test-002>. In other words, there is a condition (@noun-form, surface expression (okonau) - superior structure-function name (wo object)) and a condition called a test related to BINARY_CONTRAST.

2. In order to retrieve and identify the required information related to English from the Japanese analysis result, there are two elements called <Required> and <Preferred>. Grammatically, the element within <Required> may be regarded as essential. For example, the subject <Subj-AGT>, the objective word <DirObj-PATIENT> and the like are such essential elements within <Required>. On the other hand, even if the element within <Preferred> is not essential, it may be regarded that the element is required in order to sufficiently convey the meaning related to the core phrase. For example, in virtually all cases where a test is conducted, the purpose of the test is already determined. In English, when one says "conduct a test", "for (some reason)" is often said together. Hence, to indicate this phenomenon and to teach the user who uses Japanese, this embodiment uses the element <Preferred>. There is an element structure called <Japanese> for use in retrieving this information from the Japanese input. In this structure, the object information, that is, the Japanese structure corresponding to the subject, objective word and the like is described. For example, the objective word with respect to "tesuto suru" is mainly "taisho" and the sentence often takes the form "$1_3$ wo taisho to shite, tesuto suru".

FIG. 9 shows the format of the English sentence pattern dictionary. This dictionary is used to generate the English output by use of the retrieved and identified information obtained from the English required information pattern database. There is an element called <Pattern> which describes the target pattern of the English sentence, and a <Component> element which is formed by this sentence. For example, the <Pattern> of <v-test-002> is (conduct<n-test-002>) or (conduct<n-test-003>), and the <Pattern> of <n-test-002> is (test(<p-of-001>) (<vinf-to determine-002>). The (<p-of-001>) of <Pattern> of <n-test-002> means the preposition phrase (of +noun phrase). The objective noun phrase of the preposition is described as (X1X1) by the element of <Component> in this format, and the corresponding grammatical function is described as <DirObj-PATIENT>. Similarly, the (<vinf-|to determine |-002>) of <Pattern> of <n-test-002> means verbal phrase.

FIGS. 10(a)-(d) show an example of a language conversion made in the fourth embodiment which uses the above described format in comparison with a conventional case. In FIG. 10(a) shows an example of an input Japanese sentence and a typical English translation obtained according to the conventional system, FIG. 10(b) shows an object pattern of this embodiment, FIG. 10(c) shows an intermediate output of this embodiment, and FIG. 10(d) shows an example of the analysis structure of the Japanese language sentence.

When the sentence structure analysis is made with respect to the original language sentence "hendensho wo taisho ni shite tesuto wo okonatta", the structure shown in FIG. 10(d) is obtained. This original language sentence means "a test was (or tests were) conducted on a transformer station (or transformer stations)". As indicated by this structure, the word "okonau" forms the core of the original sentence from the point of view of the sentence structure, but the phrase "tesuto wo okonau" may be regarded as being the core from the point of view of the meaning. In this embodiment, the phrase which forms the core from the point of view of the meaning will be referred to as the "core phrase".

The core phrase is determined from the structure which is input, and the parts of the structure are analyzed and used as retrieval keys to retrieve candidates of the dialogue from the <English-Patterns> of the Japanese-English required information dictionary. In this example, when the core phrase "tesuto wo okonau" is further analyzed, the structure made up of two parts, namely, the verb "okonau" and the noun form "tesuto suru" are obtained. The noun form "tesuto suru" is used as the retrieval key to retrieve the entries of FIG. 10. Next, when the retrieval is made by the <Restrictions> of the <English-Patterns> of the entry, <v-test-002> is made the object pattern by the condition (@noun-form, surface expression (okonau)-superior structure - function name (wo object)).

After the pattern is retrieved, a confirmation is made to determine whether or not the information required for the generation of the English sentence exists in the Japanese sentence. The element <Required> of the structure, <Subj-AGT> is essential. By the element <Japanese>, the case "ga" of the original Japanese sentence corresponds to <Subj-AGT>. The case "ga" does not exist in the analysis structure of the original Japanese sentence, and the required information is omitted. The last candidate within the element <Alternates> is substituted therefor. In this example, SOMEONE is used as the general substitute code. Similarly, the element <DirObj-PATIENT> of the next <Required> is retrieved from the original Japanese sentence. In this case, since the corresponding Japanese "13 wo taisho ni suru" is described by (@ taisho ni suru @ wo), the "hendensho" of the original Japanese sentence is detected and converted into the English <DirObj-PATIENT>. Next, the <Preferred> information of the pattern is detected from the original Japanese sentence. The three elements written in this example all do not exist in the original Japanese sentence and are thus not converted. However, an inquiry is made to the user if the information required to make the inquiry to the user, such as the instruction urging an inquiry to the user if necessary and the question (ask "tesuto suru mokuteki wa nan desuka"), exists within the Japanese-English required information of FIG. 8, where "tesuto suru mokuteki wa nan desuka" means ' what is the object of the test ?'.

After the above retrieval is completed, the English output is generated using the English sentence pattern dictionary of FIG. 8. The previously retrieved <v-test-002> is used to retrieve the condition of (conduct<n-test-002>) or (conduct <n-test-003>). Which one to select is decided by the conditions of <n-test-002> and <n-test-003>. In the two cases, the condition is described in the element <Component>. In the case of <n-test-002>, there is the <Component> called <Xnnn-BINARY_CONTRAST>, and in the case of <n-test-003>, there is the <Component> called <Xnnn-BOOLEAN>. However, neither exists in the original Japanese sentence and thus cannot be selected. In English, it is possible to generate an output which is more naturally completed by inserting either <Component>, and for example, the first <Xnnn-BINARY_CONTRAST> is inserted at this stage. The generated output is displayed to the user, and the output may be completed by the judgement of the user.

Further, the present invention is not limited to these embodiments, but various variations and modifications may be made without departing from the scope of the present invention.

What is claimed is:

1. A language conversion system for converting an original language into an object language using a computer, said language conversion system comprising:
   a database of expression patterns in the object language;
   relevance evaluation means, coupled to said database, for evaluating a relevance of each expression pattern in the object language to an input in the original language;
   retrieval and identification means for retrieving and identifying, from the input in the original language, information requested by the expression pattern in the object language which is required to generate an output in the object language;
   selection means for selecting the expression pattern in the object language conforming to the input in the original language, depending on the relevance evaluated in said relevance evaluation means;
   output means for generating the output in the object language, based on the required information retrieved and identified from the input in the original language by said retrieval and identification means; and
   control means, coupled to said relevance evaluation means, said retrieval and identification means, said selection means, and said output means, for controlling operation sequences thereof.

2. The language conversion system as claimed in claim 1, wherein said output means generates the output of the object language in an incomplete form if the required information cannot be determined, said incomplete form including unknown information as it is.

3. The language conversion system as claimed in claim 1, wherein the input in the original language takes an analysis structure of an original language sentence, and said retrieval and identification means retrieves and identifies the required information using retrieval keys which are surface expressions or combinations of the surface expressions and retrieval keys including grammatical and semantic function names.

4. The language conversion system as claimed in claim 1, which further comprises analysis means, coupled to said control means, for obtaining the input in the original language by analyzing a character string in the original language.

5. The language conversion system as claimed in claim 1, which further comprises inquiry means, coupled to said control means, for obtaining the required information through inquiries to a user, and wherein said output means generates the output in the original language based on a combination of the required information which is retrieved and identified by said retrieval and identification means and the required information obtained by said inquiry means.

6. The language conversion system as claimed in claim 5, wherein said inquiry means makes inquiries to the user immediately when the required information cannot be retrieved and identified from the input in the original language by said retrieval and identification means.

7. The language conversion system as claimed in claim 5, wherein said retrieval and identification means first attempts to retrieve and identify all the required information from the input in the original language, and said inquiry means makes the inquiries to the user only if there is missing information in the required information retrieved and identified by said retrieval and identification means.

8. The language conversion system as claimed in claim 1, wherein said database includes in the expression patterns essential elements which are essential and possibly omittable elements which may possibly be omitted, and treats a plurality of expression patterns differing only in the possibly omittable elements as a single expression pattern.

9. The language conversion system as claimed in claim 8, wherein additional information which indicates the possibility of omitting an element is added to each structural element of the expression patterns stored in said database, and said control means determines a behavior of the language conversion system depending on the additional information if said retrieval and identification means cannot obtain the structural element from the input in the original language.

10. The language conversion system as claimed in claim 9, wherein said control means determines the behavior of the language conversion system depending on the possibility of omitting each structural element of the expression pattern in the object language if the structural element cannot be obtained through the inquiries to the user made by said inquiry means.

11. The language conversion system as claimed in claim 9, wherein said control means includes means for selectively determining the behavior of the language conversion system from a plurality of behaviors depending on the possibility of omitting each structural element of the expression pattern in the object language if the structural element cannot be obtained.

12. The language conversion system as claimed in claim 9, wherein said control means determines the behavior of the language conversion system so that said inquiry means makes the inquiries to the user or a structural element is processed as it is as an unknown depending on the possibility of omitting each structural element of the expression pattern in the object language if the structural element cannot be obtained from the input in the original language.

13. The language conversion system as claimed in claim 9, wherein said control means determines the behavior of the language conversion system so that said output means generates an output which indicates a missing structural element or generates an output which neglects the missing structural element depending on the possibility of omitting each structural element of the expression pattern in the object language if the structural element finally cannot be obtained from the input in the original language.

14. The language conversion system as claimed in claim 5, wherein said relevance evaluation means and said retrieval and identification means are realized by a predetermined database which can easily be modified and interpreting and applying means for interpreting and applying the predetermined database, said predetermined database including information for evaluating the relevance of the expression patterns in the object language with respect to the input in the original language and information for retrieving and identifying the required information from the input in the original language, said interpreting and applying means selecting the expression patterns in the object language conforming to the input in the original language through interpretation and application of the information contained in the predetermined database and retrieving and identifying the required information from the input in the original language through the interpretation and application.

15. The language conversion system as claimed in claim 14, wherein the predetermined database includes information for making the inquiries to the user from said inquiry means.

16. The language conversion system as claimed in claim 14, wherein the data base includes additional information indicating the possibility of omitting each structural element within the expression patterns in the object language.

17. The language conversion system as claimed in claim 16, wherein said control means determines a behavior of the language conversion system depending on the additional information.

* * * * *